United States Patent [19]

Schweier et al.

[11] 4,175,170

[45] Nov. 20, 1979

[54] MANUFACTURE OF OLEFIN POLYMERS

[75] Inventors: Guenther Schweier, Ludwigshafen; Robert Bachl, Worms; Heinz Mueller-Tamm, Ludwigshafen; Hans Frielingsdorf, Bad Durkheim; Wolfgang Gruber, Frankenthal; Erich Kolk, Bad Durkheim, all of Fed. Rep. of Germany

[73] Assignee: BASF Aktiengesellschaft, Fed. Rep. of Germany

[21] Appl. No.: 720,777

[22] Filed: Sep. 7, 1976

[30] Foreign Application Priority Data

Sep. 27, 1975 [DE] Fed. Rep. of Germany ....... 2543181

[51] Int. Cl.$^2$ ........................... C08F 4/02; C08F 10/02
[52] U.S. Cl. ................................. 526/125; 252/429 C; 252/431 R; 526/119; 526/124; 526/129; 526/151; 526/153; 526/352
[58] Field of Search ........... 252/429 B, 429 C, 431 R; 526/124, 125, 129, 153, 156

[56] References Cited

U.S. PATENT DOCUMENTS

| 3,718,635 | 2/1973 | Tomoshige et al. | 526/129 |
|---|---|---|---|
| 3,787,384 | 1/1974 | Stevens et al. | 526/156 |
| 3,956,255 | 5/1976 | Ort | 526/129 |

FOREIGN PATENT DOCUMENTS

| 2352154 | 6/1974 | Fed. Rep. of Germany. |
|---|---|---|
| 1264416 | 2/1972 | United Kingdom. |
| 1381605 | 1/1975 | United Kingdom. |

Primary Examiner—Edward J. Smith
Attorney, Agent, or Firm—Keil & Witherspoon

[57] ABSTRACT

Manufacture of polymers of α-monoolefins by polymerization with a Ziegler catalyst system comprising (1) a catalyst component containing titanium and/or vanadium and (2) a particular compound of the metals aluminum, magnesium or zinc. The characteristic feature of the process according to the invention is that the catalyst component (1) containing titanium and/or vanadium is the solid-phase product (VII) contained by first (1.1) bringing a finely divided porous inorganic oxidic material (I), which has the formula $Al_2O_3$ or $SiO_2.aAl_2O_3$, where a is a number from 0 to 2, into contact with an aluminum compound (II) dissolved in an organic solvent, to form a solid-phase product (III), then (1.2) bringing the solid-phase product (III) obtained in stage (1.1) into contact with a magnesium compound (IV), dissolved in an organic solvent, to form a solid-phase product (V), and finally (1.3) bringing the solid-phase product (V) obtained in stage (1.2) into contact with a compound (VI) of the transition metals titanium and/or vanadium to form a solid-phase product (VII). This process functions better than comparable conventional processes.

8 Claims, No Drawings

MANUFACTURE OF OLEFIN POLYMERS

The present invention relates to a process for the manufacture of homopolymers and copolymers of α-monoolefins of 2 to 10 carbon atoms by polymerizing the monomer or monomers, at from 30° to 200° C. and pressures of from 0.1 to 200 bars, by means of a Ziegler catalyst system comprising
(1) a catalyst component containing titanium and/or vanadium and
(2) a metal compound of the general formula $$MeA_{m-n}X_n$$

where Me is the metal aluminum, magnesium or zinc, A is a hydrocarbon radical of 1 to 12 carbon atoms, X is chlorine, bromine, iodine or hydrogen, m is the valency of the metal Me and n is a number from 0 to m−1,
the atomic ratio of transition metal in catalyst component (1) to metal (me) in catalyst component (2) being from 1:0.1 to 1:500.

A plurality of variants of such processes is known, the catalyst component (1) being, in each case, of a particular chemical and/or physicochemical type.

Modifications of the type of the catalyst component (1), which contains titanium and/or vanadium, are carried out in order to achieve certain objectives, e.g. to obtain the following types of systems:

(a) Catalyst systems which are able to give an increased yield of polymer, namely catalyst systems with increased productivity, i.e. systems where the amount of polymer formed per unit weight of the catalyst component (1) is increased.

(b) Catalyst systems which introduce less halogen, if any, into the polymer, this being achievable by (b₁) increasing the yield in accordance with (a) and/or (b₂) employing catalyst components (1) containing titanium and/or vanadium, which at the same time contain very little or no halogen.

(c) Catalyst systems which reveal their activity even at relatively low temperatures, as can be of importance, for example, for solid-phase polymerizations.

(d) Catalyst systems by means of which the morphological properties of the polymers are influenced in certain ways, e.g. to produce a uniform particle size and/or a high bulk density; this can be of importance, for example, in order to facilitate technical control of polymerization systems or the working up of the polymers, and/or to improve the processability of the polymers.

(e) Catalyst systems which are simple and safe to manufacture and easy to handle, e.g. systems which can be prepared in (inert) hydrocarbon auxiliary media.

(f) Catalyst systems which make it possible to manage with relatively small amounts of molecular weight regulators when carrying out polymerizations in the presence of such regulators, e.g. hydrogen; this can be of importance with respect to, for example, the thermodynamics of the process.

(g) Catalyst systems designed for special polymerization processes, e.g. systems designed, for example, either to suit the specific features of suspension polymerization or the specific features of solid-phase polymerization.

Experience to date has shown that amongst the numerous objectives there are some which can only be achieved by modification of the nature of the catalyst component (1) containing titanium and/or vanadium, at the cost of other objectives.

In these circumstances, efforts are generally made to find modifications by means of which it is not only possible to achieve the set objectives, but also to encroach on other desirable objectives as little as possible.

It is an object of the present invention to provide a new type of catalyst component (1) containing titanium and/or vanadium, by means of which—given comparable objectives—better results can be achieved than with conventional catalyst components (1) containing titanium and/or vanadium.

We have found that this object is achieved if, in the process defined at the outset, the catalyst component (1) containing titanium and/or vanadium is a product, obtained in a particular way, of certain finely divided, porous, inorganic oxidic materials, certain aluminum compounds, magnesium compounds and titanium or vanadium compounds.

Accordingly, the present invention relates to a process for the manufacture of homopolymers and copolymers of α-monoolefins of 2 to 10 carbon atoms by polymerizing the monomer or monomers at from 30° to 200° C. and pressures of from 0.1 to 200 bars by means of a Ziegler catalyst system comprising
(1) a catalyst component containing titanium and/or vanadium and
(2) a metal compound of the general formula $$MeA_{m-n}X_n,$$

where Me is the metal aluminum, magnesium or zinc, preferably aluminum, A is a hydrocarbon radical of 1 to 12 carbon atoms, especially alkyl of 1 to 12 carbon atoms and preferably alkyl of 2 to 8 carbon atoms, X is chlorine, bromine iodine or hydrogen, preferably chlorine or hydrogen, m is the valency of the metal Me and n is a number from 0 to m−1, preferably a number from 0 to 1,
the atomic ratio of transition metal in catalyst component (1) to metal Me in catalyst component (2) being from 1:0.1 to 1:500, preferably from 1:0.2 to 1:200, in which process the catalyst component (1) containing titanium and/or vanadium is the solid-phase product (VII) obtained by first (1.1) bringing a finely divided porous inorganic oxidic material (I), which has a particle diameter of from 1 to 1,000μ, preferably from 1 to 400μ, a pore volume of from 0.3 to 3, preferably from 1 to 2.5, cm³/g, and a surface area of from 100 to 1,000, preferably from 200 to 400, m²/g, and which has the formula $Al_2O_3$ or $SiO_2 \cdot aAl_2O_3$, where a is a number from 0 to 2, especially from 0 to 0.5, into contact with an aluminum compound (II) dissolved in an organic solvent and having the general formula $$AlB_{3-p}Y_p,$$

where B is a hydrocarbon radical of 1 to 12 carbon atoms, especially alkyl of 1 to 12 carbon atoms, and preferably alkyl of 1 to 8 carbon atoms, Y is chlorine, bromine, iodine, hydrogen or OR, preferably chlorine, hydrogen or OR, R is a hydrocarbon radical of 1 to 12 carbon atoms, especially alkyl of 1 to 12 carbon atoms and preferably alkyl of 1 to 8 carbon atoms, and p is a number from 0 to 3, preferably from 0 to 2, to form a solid-phase product (III), the weight ratio of the inorganic oxidic material (I) to the aluminum compound (II) being from 1:0.05 to 1:10, preferably from 1:0.2 to 1:3, and then (1.2) bringing the solid-phase product (III) obtained from stage (1.1) into contact with a magnesium compound (IV), preferably a compound which contains bonded halogen and/or carbon, dissolved in an organic solvent, to form a solid-phase product (V), the weight ratio of solid-phase product (III) to magnesium compound (IV) being from 1:0.01 to 1:0.25, preferably from 1:0.05 to 1:0.2, and finally (1.3) bringing the solid-phase product (V) obtained from stage (1.2) into contact with a solid or liquid transition metal compound (VI) dissolved in an organic solvent, or a liquid transition metal compound (VI) without solvent, the transition metal being titanium and/or vanadium, to form a solid-phase product (VII), the weight ratio of solid-phase product (V) to transition metal in the transition metal compound (VI) being from 1:0.01 to 1:20, preferably from 1:0.1 to 1:15.

It should furthermore be noted that the special feature of the process according to the invention resides essentially in the new catalyst component (1) containing titanium and/or vanadium. This catalyst component combines, to a high degree, several desirable properties. Thus it not only initiates polymerization relatively slowly but also reaches its maximum activity relatively slowly, both of which features are of substantial advantage from the point of view of controlling the process in industrial operation. The new catalyst component also offers other advantages; for example, it permits the manufacture of products having particularly advantageous morphological properties.

Taking the special features according to the invention into consideration, the new process can be carried out in virtually all relevant conventional technological variations, e.g. as a batchwise, stepwise or continuous process, which may be, for example, a suspension polymerization process, solution polymerization process or solid-phase polymerization process. The technological embodiments mentioned, i.e. the technical variants of the Ziegler polymerization of olefins, are well known from the literature and from industrial practice, and more detailed comments thereon are superfluous. It should however be noted that the new catalyst component (1) containing titanium and/or vanadium can be brought together with the catalyst component (2) in the same way as corresponding conventional catalyst components, e.g. outside, or within, the polymerization vessel, in the latter case by, say, spatially separate introduction of the components, which can be handled in the form of a suspension (catalyst component (1)) or solution (catalyst component (2)). It is also possible, for example, to employ the catalyst component (1) or the combined catalyst components (1) and (2) in the form of particles which are encapsulated in wax; this is a procedure which can be of advantage in solid-phase polymerization processes.

As regards the actual new catalyst component (1), containing titanium and/or vanadium, the following should be noted:

The component is manufactured in three stages, referred to, in both the preceding and the subsequent text, as (1.1), (1.2) and (1.3).

(1.1) In this first stage, an inorganic oxidic material (I) of the type defined above and a dissolved aluminum compound (II) of the type defined above are brought into contact with one another, whereupon a solid-phase product (III) is formed.

In detail, an advantageous procedure is the following: first, a suspension, of from 1 to 50 percent strength by weight, preferably of about 20 percent strength by weight, of the inorganic oxidic material (I), and a solution of from 5 to 80 percent strength by weight, preferably of about 30 percent strength by weight, of the aluminum compound (II) are prepared in separate batches, the suspension medium used and solvent used being particularly hydrocarbons, preferably relatively low-boiling alkane hydrocarbons, e.g. hexanes, heptanes or gasolines. The suspension and the solution are then combined in proportions which give the desired weight ratio. In general, they are combined by introducing the solution into the suspension, whilst stirring, since this procedure is more practical than vice versa, although the latter is also feasible. At from $-10°$ to $140°$ C., especially at about $20°$ C., the formation of the solid-phase product (III) takes place in the course of from 5 to 300 minutes, especially from 15 to 120 minutes. This solid-phase product contained in the suspension medium or solvent can be used directly for the second stage (1.2), especially if the second stage employs a magnesium compound which is present as a solution in a similar solvent. It may, however, also be advantageous to purify the product (III) before it is processed further. Two possible methods of purification are the following: (a) the product (III) is separated from the liquid phase by filtration and washed with pure liquid (which may be of the same type as that which has been used as the suspension medium or solvent), after which the product is, if desired, dried, for instance under reduced pressure; (b) the product is purified by digesting, i.e. by repeated decanting, in which case the liquid used can be, e.g., the liquid to be employed in the second stage (1.2) as a solvent for the magnesium compound. We have found that it is most advantageous, in a number of cases, to isolate the product (III) in a simple manner by stripping off the volatiles from stage (1.1), i.e. the suspension medium and/or solvent, under reduced pressure at from $0°$ to $100°$ C.

(1.2) In this second stage, the solid-phase product (III) obtained according to (1.1) and a dissolved magnesium compound (IV) are brought into contact with one another, resulting in the formation of a solid-phase product (V).

In detail, the procedure which can be followed is generally similar to that described for the first stage (1.1), in that the product (III) is employed in suspension or undiluted and the magnesium compound is employed in solution (of from 0.5 to 50 percent strength by weight, preferably of about 20 percent strength by weight). The formation of the solid-phase product (V) in stage (1.2) takes place at from $10°$ to $100°$ C., especially at from $20°$ to $75°$ C., in the course of from 10 to 360 minutes, especially from 15 to 120 minutes. The isolation of the product (V), and, where desired, purification thereof, can again be carried out along the same general lines as for the product (III), i.e. the product (V) can be isolated in the dry solid form or as a suspension. We have found that it is in general particularly advantageous to isolate the product (V) in a homogeneous, dry, solid form, for example by stripping off the volatiles from stage (1.2), whilst constantly ensuring the homogeneity of the treated material. Rotary evaporators operating at pressures of from 0.01 to 760 mm Hg and at from $20°$ to $200°$ C. have, for example, proved advantageous for this purpose, low pressures being employed with low temperatures and high pressures with high temperatures, as is conventional.

(1.3) In this third stage, the solid-phase product (V) obtained according to (1.2) and a transition metal compound (VI) are brought into contact with one another, resulting in the formation of a solid-phase product (VII), which is the new catalyst component (1) of the invention, containing titanium and/or vanadium.

In detail, the procedure which can be followed here is again generally similar to that described for the first stage (1:1). It has proved particularly advantageous to employ the product (V) in a dry form. Titanium or vanadium compounds which are inherently liquid can be used undiluted or as a solution in a solvent; inherently solid titanium or vanadium compounds are employed in the form of solutions. The concentration of the solutions should not be less than 5 percent by weight; as regards the type of solvent, the same remarks apply as to stage (1.1). The formation of the solid-phase product (VII) in stage (1.3) takes place at from 20° to 200° C., especially from 50° to 150° C., in the course of from 10 to 360 minutes, especially from 15 to 120 minutes.

The new catalyst components (1) of the invention, containing titanium and/or vanadium, i.e. the solid-phase products (VII), can be employed in the process defined at the outset, for the manufacture of the polymers mentioned there, and are used in the same manner as that in which compounds containing titanium and/or vanadium are conventionally used in a Ziegler polymerization of olefins. To this extent, the process according to the invention thus exhibits no special features, and reference may be made to the methods of use which are well-known from the literature and from industrial practice. It merely remains to state that the process is particularly suitable for the manufacture of homopolymers of ethylene and that in the case of the manufacture of copolymers of ethylene with higher α-monoolefins or the manufacture of homopolymers of higher α-monoolefins, suitable α-monoolefins are above all propene, but-1-ene, 4-methylpent-1-ene, hex-1-ene and oct-1-ene. The molecular weights of the polymers can be regulated in conventional manner, especially by using hydrogen as regulator.

As regards the composition of the new catalyst components (1) containing titanium and/or vanadium, the following additional details should be noted:

(1.1) The inorganic oxidic material (I) in stage (1.1) will in general be an aluminum oxide, an aluminosilicate or, in particular, a silicon dioxide; it is important that the material conforms to the required parameters and is as dry as possible (no further weight loss after 6 hours at a temperature of 160° C. and a pressure of 2 mm Hg). Examples of suitable aluminum compounds (II) are aluminum trialkyls, aluminum dialkyl-hydrides, aluminum dialkyl-chlorides, aluminum alkyl-dichlorides, aluminum trichloride, aluminum trialkoxides, aluminum dialkoxy-chlorides, aluminum alkoxy-dichlorides, alkyl-aluminum dialkoxides and dialkyl-aluminum alkoxides. Particularly suitable aluminum compounds are those of the formulae $Al(i-C_4H_9)_2H$, $Al(C_2H_5)_2Cl$, $Al(C_2H_5)_{1.5}Cl_{1.5}$, $Al(C_2H_5)Cl_2$, $Al(OC_2H_5)_3$, $Al(O-i-C_3H_7)_3$, $Al(OC_2H_5)_2C_2H_5$ and $Al(OC_2H_5)(C_2H_5)_2$.

The aluminum compounds (II) can be employed in the form of individual compounds, mixtures of two or more individual compounds, and sesqui-compounds.

(1.2) The magnesium compound (IV) to be employed in stage (1.2) can advantageously be a compound from the following categories of magnesium compounds:

(A) Magnesium compounds of the general formula $Mg(OR')_2$, where $R'$ is a hydrocarbon radical of 1 to 10 carbon atoms, especially alkyl of 1 to 6 carbon atoms.

Examples of very suitable compounds are magnesium methylate, ethylate, n-propylate, i-propylate, cyclohexylate and phenolate.

Magnesium ethylate and n-propylate are particularly suitable.

(B) Complex alkoxides or phenoxides of magnesium with other metals, especially with lithium, boron, aluminum and titanium.

Examples of very suitable compounds are the complex alkoxides of the formulae $Mg[Al(OC_2H_5)_4]_2$, $Mg_3[Al(OC_2H_5)_6]_2$, $Li_2[Mg(OC_3H_7)_4]$, $Mg[Ti(OC_3H_7)_6]$ and $Mg[B(OC_2H_5)_4]_2$.

(C) Magnesium halides of the general formula $MgZ_2$, where Z is chlorine, bromine or iodine, especially chlorine or bromine.

Examples of very suitable compounds are magnesium chloride and bromide.

(D) Complexes of the magnesium halides listed under (C) with alcohols of 1 to 6 carbon atoms, especially with alkanols of 1 to 6 carbon atoms.

Particularly suitable compounds are the complexes of the formulae $MgCl_2.6C_2H_5OH$ and $MgCl_2.4CH_3OH$.

(E) Magnesium halide compounds of the general formula $MgZ(OR')$, where Z is as defined under (C) and $R'$ is as defined under (A).

A particularly suitable compound has the formula $MgCl(OC_2H_5)$.

(F) Manasseite (formula: $Mg_6.Al_2.(OH)_{16}.CO_3.4-H_2O$), which has been brought to a chlorine content of from 50 to 75 percent by weight by halogenation with phosgene.

(G) Magnesium carboxylates, especially magnesium carboxylates of the general formula $Mg(OCOR')_2$, where $R'$ is as defined under (A).

Very suitable compounds are magnesium acetate, propionate, stearate and benzoate.

(H) Magnesium compounds of the general formula $R''MgZ'$, where $R''$ is a hydrocarbon radical of 1 to 12 carbon atoms, especially alkyl of 1 to 8 carbon atoms, and $Z'$ is chlorine, bromine, iodine or an $R'''$—O— group, but especially chlorine or bromine.

Particularly suitable compounds are, for example, ethylmagnesium chloride, n-butylmagnesium chloride and n-octylmagnesium chloride.

(I) Magnesium dialkyls, where alkyl is preferably of 1 to 6 carbon atoms.

Magnesium diethyl should be singled out.

(J) Complexes of magnesium dialkyls and other metal alkyls, e.g. the complex of 1 mole of magnesium diethyl and 1 mole of aluminum triethyl.

(K) Magnesium salts of CH-acidic compounds, e.g. those described in the laid-open documents of Belgian Pat. No. 823,220.

Typical very suitable examples from this category are magnesium acetylacetonate and magnesium ethyl acetoacetate.

The magnesium compounds (IV) can be employed in the form of individual compounds or as mixtures of two or more individual compounds.

Suitable solvents for the magnesium compounds (IV) are:

hydrocarbons, especially alkanes, e.g. n-butane, n-pentane, n-hexane, n-heptane and the corresponding branched alkanes carrying methyl groups as substituents, and also gasoline and cyclohexane; alcohols, particularly alkanols, e.g. methanol, ethanol, n-propanol and i-propanol; ethers, e.g. diethyl ether, diisopropyl ether, tetrahydrofuran and glycol ethers; and esters, particularly esters of alkanecarboxylic acids with alkanols, e.g. ethyl acetate, ethyl propionate and isopropyl acetate, and esters of titanic acid, e.g. tetraisopropyl titanate or tetra-n-butyl titanate.

Of these, the following are particularly suitable for the above categories of magnesium compounds: hydrocarbons for categories A, B and G; alcohols for categories A, B, C, D, E, F, G and K; ethers for categories H, I and J; esters for categories A, B, C, D, E, F, G and K.

(1.3) The transition metal compound (VI) to be employed in stage (1.3) can advantageously be one of those conventionally used for the Ziegler polymerization of olefins. Halides, particularly chlorides, of titanium, and alkoxy-halides, preferably those where alkoxy is of 1 to 6 carbon atoms, of titanium, are particularly suitable, as are halides, preferably chlorides, of vanadium, and oxyhalides, preferably oxychlorides, of vanadium.

Representative examples are compounds of the formulae $TiCl_4$, $TiBr_4$, $TiCl_2(O-i-C_3H_7)_2$, $VCl_5$ and $VOCl_3$. $TiCl_4$ is outstandingly suitable.

The transition metal compounds (VI) can be employed in the form of individual compounds or as mixtures of two or more individual compounds.

The relevant conventional compounds can be used as the catalyst component (2); specific examples of suitable compounds are $Al(C_2H_5)_3$, $Al(C_2H_5)_2Cl$, $Al(C_2H_5)_2H$, $Al(i-C_4H_9)_3$, $Al(n-C_4H_9)_3$ and $Al(C_8H_{17})_3$.

In conclusion, it should be noted that the catalyst components (1) of the invention, containing titanium and/or vanadium, i.e. the products (VII), and their precursors and intermediates which have been mentioned, are sensitive to hydrolysis and oxidation. Accordingly, when handling these substances, the usual precautionary measures for Ziegler catalysts should be taken (e.g. exclusion of moisture and use of an inert gas atmosphere).

EXAMPLE 1

Manufacture of the Catalyst Component (1) Containing Titanium.

(1.1) First stage of manufacture

The starting materials are 250 parts by weight of silicon dioxide ($SiO_2$; I; particle diameter: from 37 to 125$\mu$, pore volume: 1.6 cm$^3$/g, surface area: 300 m$^2$/g), suspended in 1,700 parts by weight of n-heptane, and 130 parts by weight of diethyl aluminum chloride (II), dissolved in 200 parts by weight of n-heptane.

The above solution is introduced into the above suspension in the course of 90 minutes at 20° C., whilst stirring, and the batch is then kept at this temperature for a further 60 minutes, with continued stirring.

The solid-phase product (III) is isolated from the suspension by filtering, washing with n-heptane and drying under reduced pressure; it is then employed in the second stage (1.2).

(1.2) Second stage of manufacture

The starting materials are 270 parts by weight of the product (III) obtained according to (1.1) and 63 parts by weight of magnesium acetylacetonate (IV), dissolved in 800 parts by weight of methanol.

The above components are combined and the resulting suspension is kept at about 60° C. for 30 minutes.

The solid-phase product (V) is isolated from the suspension by stripping off the volatiles in a rotary evaporator which is brought down to an operating pressure of 10 mm Hg and up to an operating temperature of 90° C.

(1.3) Third stage of manufacture

The starting materials are 250 parts by weight of the product (V) obtained according to (1.2) and 700 parts by weight of titanium tetrachloride (VI), which are dissolved in 1,000 parts by weight of n-heptane.

The amounts correspond to a weight ratio of solid-phase product (V) to transition metal in the transition metal compound (VI) of about 1:0.71.

The above components are combined and the resulting suspension is kept at about 100° C. (reflux conditions) for 60 minutes.

The resulting suspension of the solid-phase product (VII) is filtered, and the product is then washed with three times 500 parts by weight of n-heptane and dried under reduced pressure. Analysis of the resulting product (VII), i.e. of the catalyst component (1) containing titanium, indicates a titanium content of 4.8 percent by weight.

Polymerization 0.4 part by weight of the catalyst component (1) containing titanium is suspended in 20 parts by weight of heptane and 1.6 parts by weight of aluminum triisobutyl (2) are added (this amount corresponds to an atomic ratio of titanium in catalyst component (1) to metal (Me=aluminum) in catalyst component (2) of about 1:20).

The Ziegler catalyst system thus obtained is introduced into a stirred autoclave which has been charged with 3,000 parts by weight (corresponding to about 40% of its capacity) of isopentane. Polymerization is then carried out for 3 hours, whilst stirring, with the following parameters, which are regulated so as to remain constant: ethylene pressure=15 bars, hydrogen pressure=5 bars, temperature=100° C.; polymerization is then discontinued by venting the autoclave.

Further details on the product are to be found in the Table given later.

EXAMPLE 2

The Catalyst Component (1) Containing Titanium is Manufactured as in Example 1

Polymerization 0.05 part by weight of the catalyst component (1) containing titanium is suspended in 10 parts by weight of n-heptane and 0.3 part by weight of aluminum triisobutyl (2) is added (this amount corresponds to an atomic ratio of titanium in catalyst component (1) to metal (Me=aluminum) in catalyst component (2) of about 1:30.

The Ziegler catalyst system thus obtained is introduced into a stirred autoclave which has been charged with 80 parts by weight (corresponding to about 20% of its capacity) of finely divided polyethylene. Polymerization is then carried out for 2 hours, whilst stirring, with the following parameters, which are regulated so as to remain constant: ethylene pressure=27.5 bars, hydrogen pressure=5 bars, temperature=100° C.; polymerization is then discontinued by venting the autoclave.

Further details on the product are to be found in the Table given later.

EXAMPLE 3

Manufacture of the Catalyst Component (1) Containing Titanium (1.1) First stage of manufacture The starting materials are 20 parts by weight of silicon dioxide ($SiO_2$; I; particle diameter: from 1 to 40$\mu$, pore volume: 1.9 $cm^3/g$, surface area: 310 $m^2/g$), suspended in 140 parts by weight of n-heptane, and 15 parts by weight of $(C_2H_5)_{1.5}AlCl_{1.5}$ (II), dissolved in 10 parts by weight of n-heptane.

The above suspension is introduced into the above solution in the course of 60 minutes at 10° C., whilst stirring, and the batch is then kept at this temperature for a further 30 minutes, with continued stirring.

The solid-phase product (III) is isolated from the suspension, by filtering it off, washing it with n-heptane and drying it under reduced pressure; it is then employed in the second stage (1.2).

(1.2) Second stage of manufacture

The starting materials are 20 parts by weight of the product (III) obtained according to (1.1) and 5 parts by weight of manasseite ($Mg_6.Al_2.(OH)_{16}.CO_3.4H_2O$), which has been brought to a chlorine content of 71 percent by weight by halogenation with phosgene, (IV), the material being dissolved in 150 parts by weight of methanol.

The above components are combined and the resulting suspension is kept at about 70° C. for 15 minutes. The solid-phase product (V) is isolated from the suspension by stripping off the volatiles in a rotary evaporator which is brought down to an operating pressure of 12 mm Hg and up to an operating temperature of 95° C.

(1.3) Third stage of manufacture

The starting materials are 12 parts by weight of the product (V) obtained according to (1.2) and 150 parts by weight of titanium tetrachloride (VI).

The amounts correspond to a weight ratio of solid-phase product (V) to transition metal in the transition metal compound (VI) of about 1:3.2.

The above components are combined and the resulting suspension is kept at about 135° C. (reflux conditions) for 60 minutes.

The resulting suspension of the solid-phase product (VII) is filtered, and the product is then washed with four times 50 parts by weight of n-heptane and dried under reduced pressure. Analysis of the resulting product (VII), i.e. of the catalyst component (1) containing titanium, indicates a titanium content of 5.1 percent by weight.

Polymerization 0.185 part by weight of the catalyst component (1) containing titanium is suspended in 20 parts by weight of n-heptane and 1.6 parts by weight of aluminum triisobutyl (2) are added (this amount corresponds to an atomic ratio of titanium in catalyst component (1) to metal (Me=aluminum) in catalyst component (2) of about 1:41).

The Ziegler catalyst system thus obtained is introduced into a stirred autoclave which has been charged with 7,500 parts by volume (corresponding to about 60% of its capacity) of isobutane. Polymerization is then carried out for 90 minutes, whilst stirring, with the following parameters, which are regulated so as to remain constant: ethylene pressure=20 bars, hydrogen pressure=5 bars, temperature=95° C.; polymerization is then discontinued by venting the autoclave.

Further details on the product are to be found in the Table given later.

EXAMPLE 4

Manufacture of the Catalyst Component (1) Containing Titanium (1.1) First stage of manufacture The starting materials are 23 parts by weight of silicon dioxide ($SiO_2$; I; particle diameter: from 100 to 250$\mu$, pore volume: 0.9 $cm^3/g$, surface area: 230 $m^2/g$), suspended in 100 parts by weight of n-heptane, and 7.7 parts by weight of diethyl aluminum chloride (II), dissolved in 15 parts by weight of n-heptane.

The above solution is introduced into the above suspension in the course of 20 minutes at 25° C., whilst stirring, and the batch is then kept at this temperature for a further 15 minutes, with continued stirring.

The solid-phase product (III) is isolated from the suspension by filtering it off, washing it with n-heptane and drying it under reduced pressure; it is then employed in the second stage (1.2).

(1.2) Second stage of manufacture

The starting materials are 21.5 parts by weight of the product (III) obtained according to (1.1) and suspended in 100 parts by weight of n-heptane, and 3.6 parts by weight of $Mg(OC_2H_5)_2$ (IV), which are dissolved in 5.3 parts by weight of $Ti(O-n-C_4H_9)_4$.

The above components are combined and the resulting suspension is kept at about 70° C. for 30 minutes. The solid-phase product (V) is isolated from the suspension by stripping off the volatiles in a rotary evaporator which is brought down to an operating pressure of 10 mm Hg and up to an operating temperature of 90° C.

(1.3) Third stage of manufacture

The starting materials are 20 parts by weight of the product (V) obtained according to (1.2) and 7.7 parts by weight of $TiCl_4$ (VI), which are dissolved in 100 parts by weight of n-heptane.

The amounts correspond to a weight ratio of solid-phase product (V) to transition metal in the transition metal compound (VI) of about 1:0.1.

The above components are combined and the resulting suspension is kept at about 98° C. (reflux conditions) for 60 minutes.

The resulting suspension of the solid-phase product (VII) is filtered, and the product is then washed with three times 50 parts by weight of n-heptane and is dried under reduced pressure. Analysis of the resulting product (VII), i.e. of the catalyst component (1) containing titanium, indicates a titanium content of 4.1 percent by weight.

Polymerization 0.1 part by weight of the catalyst component (1) containing titanium is suspended in 10 parts by weight of n-heptane and 0.3 part by weight of $Al(iC_4H_9)_3$ (2) is added (this amount corresponds to an atomic ratio of titanium in catalyst component (1) to metal (Me=aluminum) in catalyst component (2) of about 1:17.7).

The Ziegler catalyst system thus obtained is introduced into a stirred autoclave which has been charged with 80 parts by weight (corresponding to about 20% of its capacity) of finely divided polyethylene. Polymerization is then carried out for 2 hours, whilst stirring, with the following parameters, which are regulated so as to remain constant: ethylene pressure=27.5 bars, hydrogen pressure=5 bars, temperature=100° C.; polymerization is then discontinued by venting the autoclave.

Further details on the product are to be found in the Table given later.

EXAMPLE 5

Manufacture of the Catalyst Component (1) Containing Titanium (1.1) First stage of manufacture The starting materials are 25 parts by weight of silicon dioxide ($SiO_2$; I; particle diameter: from 1 to 300$\mu$, pore volume: 2.1 cm$^3$/g, surface area: 330 m$^2$/g), suspended in 100 parts by weight of n-heptane, and 18.3 parts by weight of $Al(C_2H_5)_2Cl$ (II), dissolved in 30 parts by weight of n-heptane.

The above solution is introduced into the above suspension in the course of 10 minutes at 10° C., whilst stirring, and the batch is then kept at this temperature for a further 15 minutes, with continued stirring.

The solid-phase product (III) is isolated from the suspension by filtering it off, washing it twice with n-heptane and drying it under reduced pressure; it is then employed in the second stage (1.2).

(1.2) Second stage of manufacture

The starting materials are 24 parts by weight of the product (III) obtained according to (1.1) and 6 parts by weight of manasseite ($Mg_6.Al_2.(OH)_{16}.CO_3.4H_2O$), which has been brought to a chlorine content of 70 percent by weight by halogenation with phosgene, (IV), the material being dissolved in 150 parts by weight of ethanol.

The above components are combined at 12° C., whilst cooling, and the resulting suspension is then kept for 15 minutes at the boil (about 100° C.). The solid-phase product (V) is isolated from the suspension by stripping off the volatiles in a rotary evaporator which is brought down to an operating pressure of 0.1 mm Hg and up to an operating temperature of 120° C.

(1.3) Third stage of manufacture

The starting materials are 30 parts by weight of the product (V) obtained according to (1.2) and 350 parts by weight of $TiCl_4$ (VI).

The amounts correspond to a weight ratio of solid-phase product (V) to transition metal in the transition metal compound (VI) of about 1:2.95.

The above components are combined and the resulting suspension is kept at about 136° C. (reflux conditions) for 60 minutes.

The resulting suspension of the solid-phase product (VII) is filtered, and the product is then washed with three times 70 parts by weight of n-heptane and is dried under reduced pressure. Analysis of the resulting product (VII), i.e. of the catalyst component (1) containing titanium, indicates a titanium content of 6.88 percent by weight.

Polymerization 0.7 Part by weight of the catalyst component (1) containing titanium is suspended in 20 parts by weight of n-heptane and 1.5 parts by weight of aluminum triisobutyl (2) are added (this amount corresponds to an atomic ratio of titanium in catalyst component (1) to metal (Me=aluminum) in catalyst component (2) of about 1:7.6).

The Ziegler catalyst system thus obtained is introduced into a stirred autoclave which has been charged with 6,200 parts by weight (corresponding to about 40% of its capacity) of isopentane. Polymerization is then carried out for 2 hours, whilst stirring, with the following parameters, which are regulated so as to remain constant: ethylene pressure=19 bars, hydrogen pressure=5 bars, temperature=90° C.; polymerization is then discontinued by venting the autoclave.

Further details on the product are to be found in the Table given later.

EXAMPLE 6

Manufacture of the Catalyst Component (1), Containing Titanium (1.1) First stage of manufacture The starting materials are 21 parts by weight of silicon dioxide ($SiO_2$; I; particle diameter; from 45 to 125$\mu$, pore volume: 2.1 cm$^3$/g, surface area: 330 m$^2$/g), suspended in 50 parts by weight of n-heptane, and 5.6 parts by weight of $C_2H_5Al(OC_2H_5)_2$ (II), dissolved in 75 parts by weight of n-heptane.

The above suspension is introduced into the above solution in the course of 10 minutes at 20° C., whilst stirring, and the batch is then kept at this temperature for a further 15 minutes, with continued stirring.

The solid-phase product (III) is isolated from the suspension by removing (vaporizing) the volatiles (the temperature being raised to 108° C., and the pressure lowered to 0.1 mm Hg, in the course of 2 hours); the product is employed in the second stage (1.2).

(1.2) Second stage of manufacture

The starting materials are 21 parts by weight of the product (III) obtained according to (1.1) and 5.25 parts by weight of the chlorinated manasseite (IV), also used in Example 5, which are dissolved in 150 parts by weight of ethanol.

The above components are combined at 20° C., whilst cooling, by introducing the product III into the solution, and the resulting suspension is kept at the boil (about 100° C.) for 15 minutes. The solid-phase product (V) is isolated from the suspension by stripping off the volatiles in a rotary evaporator which is brought down to an operating pressure of 0.1 mm Hg and up to an operating temperature of 120° C.

(1.3) Third stage of manufacture

The starting materials are 26 parts by weight of the product (V) obtained according to (1.2) and 250 parts by weight of $TiCl_4$ (VI).

The amounts correspond to a weight ratio of solid-phase product (V) to transition metal in the transition metal compound (VI) of about 1:2.43.

The above components are combined and the resulting suspension is kept at about 136° C. (reflux conditions) for 60 minutes.

The resulting suspension of the solid-phase product (VII) is filtered, and the product is then washed with five times 70 parts by weight of heptane and is dried under reduced pressure. Analysis of the resulting product (VII), i.e. of the catalyst component (1) containing titanium, indicates a titanium content of 6.62 percent by weight.

Polymerization 0.41 parts by weight of the catalyst component (1) containing titanium is suspended in 20 parts by weight of heptane and 1.5 parts by weight of aluminum triisobutyl (2) are added (this amount corresponds to an atomic ratio of titanium in catalyst component (1) to metal (Me=aluminum) in catalyst component (2) of about 1:13.3).

The Ziegler catalyst system thus obtained is introduced into a stirred autoclave which has been charged with 6,200 parts by weight (corresponding to about 40% of its capacity) of isopentane. Polymerization is then carried out for 2 hours, whilst stirring, with the following parameters, which are regulated so as to remain constant: ethylene pressure=19 bars, hydrogen pressure=5 bars, temperature=90° C.; polymerization is then discontinued by venting the autoclave.

Further details on the product are to be found in the Table given later.

EXAMPLE 7

Manufacture of the Catalyst Component (1), Containing Titanium (1.1) First stage of manufacture The starting materials are 25 parts by weight of an aluminosilicate of the formula $SiO_2.0.1Al_2O_3$ (I; particle diameter: from 45 to 125μ, pore volume: 0.95 cm³/g, surface area: 320 m²/g), suspended in 100 parts by weight of n-heptane, and 18.3 parts by weight of $Al(C_2H_5)_2Cl$ (II), dissolved in 30 parts by weight of n-heptane.

The above solution is introduced into the above suspension in the course of 10 minutes at 5° C., whilst stirring, and the batch is then kept at this temperature for a further 30 minutes, with continued stirring.

The solid-phase product (III) is isolated from the suspension by filtering it off, washing it with twice 70 parts by weight of n-heptane and drying it under reduced pressure; it is employed in the second stage (1.2).

(1.2) Second stage of manufacture

The starting materials are 27 parts by weight of the product (III) obtained according to (1.1) and 6 parts by weight of chlorinated manasseite (IV), also used in Example 5, which are dissolved in 100 parts by weight of ethanol.

The above components are combined and the resulting suspension is kept at about 80° C. for 15 minutes.

The solid-phase product (V) is isolated from the suspension by stripping off the volatiles in a rotary evaporator which is brought down to an operating pressure of 1 mm Hg and up to an operating temperature of 120° C.

(1.3) Third stage of manufacture

The starting materials are 30 parts by weight of the product (V) obtained according to (1.2) and 100 parts by weight of $TiCl_4$ (VI), which are dissolved in 300 parts by weight of n-heptane.

The amounts correspond to a weight ratio of solid-phase product (V) to transition metal in the transition metal compound (VI) of about 1:0.84.

The above components are combined and the resulting suspension is kept at about 100° C. (reflux conditions) for 60 minutes.

The resulting suspension of the solid-phase product (VII) is filtered, and the product is then washed with five times 70 parts by weight of n-heptane and is dried under reduced pressure. Analysis of the resulting product (VII), i.e. of the catalyst component (1) containing titanium, indicates a titanium content of 6.2 percent by weight.

Polymerization 0.5 part by weight of the catalyst component (1) containing titanium is suspended in 20 parts by weight of n-heptane and 1.5 parts by weight of $Al(C_2H_5)_3$ (2) are added (this amount corresponds to an atomic ratio of titanium in catalyst component (1) to metal (Me=aluminum) in catalyst component (2) of about 1:20.4).

The Ziegler catalyst system thus obtained is introduced into a stirred autoclave which has been charged with 6,200 parts by weight (corresponding to about 40% of its capacity) of isopentane. Polymerization is then carried out for 2 hours, whilst stirring, with the following parameters, which are regulated so as to remain constant: ethylene pressure=19 bars, hydrogen pressure=5 bars, temperature=90° C.; polymerization is then discontinued by venting the autoclave.

Further details on the product are to be found in the Table given later.

| Ex. | Yield of polyethylene, parts by weight | Grams of polyethylene per gram of catalyst component (1) | Grams of polyethylene per gram of titanium | Bulk density, g/l | PT[+] sec. | Melt index, MI 2.16, g/10 mins. |
|---|---|---|---|---|---|---|
| 1 | 2,100 | 5,250 | 109,000 | 390 | 7.0 | 1.6 |
| 2 | 290 | 5,800 | 121,000 | 480 | 7.3 | 1.0 |
| 3 | 2,200 | 11,900 | 233,000 | 310 | 7.2 | 0.3 |
| 4 | 320 | 3,200 | 78,000 | 400 | 7.4 | 2.1 |
| 5 | 5,960 | 8,550 | 124,000 | 350 | 7.9 | 0.5 |
| 6 | 4,150 | 10,100 | 153,000 | 330 | 7.8 | 0.7 |
| 7 | 3,900 | 7,800 | 120,000 | 330 | 8.5 | 0.5 |

[+]PT = pourability test, measured according to ASTM D 1895-67, Method A

We claim:

1. A process for the manufacture of a homopolymer or copolymer of an α-monoolefin of 2 to 10 carbon atoms by polymerizing the monomer or monomers at a temperature of from 30° to 200° C. and a pressure of from 0.1 to 200 bars, by means of a Ziegler catalyst system comprising (1) a catalyst component containing titanium and/or vanadium and (2) a metal compound of the general formula $$MeA_{m-n}X_n$$

where Me is aluminum, magnesium or zinc, A is a hydrocarbon radical of 1 to 12 carbon atoms, X is chlorine, bromine, iodine or hydrogen m is the valency of the metal Me and n is a number from 0 to m−1, the atomic ratio of transition metal in catalyst component (1) to metal (Me) in catalyst component (2) being from 1:0.1 to 1:500, wherein the catalyst component (1), containing titanium and/or vanadium, is the solid-phase product (VII) which has been obtained by first (1.1) bringing a finely divided porous inorganic oxidic material (I), which has a particle diameter of from 1 to 1,000μ, a pore volume of from 0.3 to 3 cm³/g, and a surface area of from 100 to 1,000 m²/g, and which has the formula $SiO_2$, into contact with an aluminum compound (II) dissolved in an organic solvent and having the general formula $$AlB_{3-p}Y_p$$

where B is hydrocarbon radical of 1 to 12 carbon atoms, Y is chlorine, bromine, iodine, hydrogen or OR, R is a hydrocarbon radical of 1 to 12 carbon atoms and p is a number from 0 to 3, to form a solid-phase product (III), the weight ratio of the inorganic oxidic material (I) employed to the aluminum compound (II) employed being from 1:0.05 to 1:10, and then (1.2) bringing the solid-phase product (III) obtained from stage (1.1) into contact with a magnesium compound (IV), dissolved in an organic solvent, to form a solid-phase product (V), the weight ratio of solid-phase product (III) employed to magnesium compound (IV) employed being from 1:0.01 to 1:0.25, the magnesium compound (IV) being a manasseite of the formula $Mg_6 \cdot Al_2 \cdot (OH)_{16} \cdot CO_3 \cdot 4H_2O$ and further being brought to a chlorine content of from 50 to 75 percent by weight by halogenation with phosgene, and finally (1.3) bringing the solid-phase product (V) obtained from stage (1.2) into contact with a solid or liquid transition metal compound (VI) dissolved in an organic solvent, or a liquid transition metal compound (VI) without solvent, the transition metal being titanium and/or vanadium, to form a solid-phase product (VII), the weight raio of solid-phase product (V) employed to transition metal in the transition metal compound (VI) employed being from 1:0.01 to 1:20.

2. A process as set forth in claim 1 wherein the inorganic oxide material (I) used has a particle diameter of 1 to 400μ, a pore volume of 1 to 2.5 cm$^3$/g, and a surface area of 200 to 400 m$^2$/g.

3. A process as set forth in claim 1 wherein the aluminum compound (II) has the general formula $AlB_{3-p}Y_p$ where B is alkyl of 1 to 8 carbon atoms, Y is chlorine, hydrogen or OR, R is alkyl of 1 to 8 carbon atoms and p is a number from 0 to 2.

4. A process as set forth in claim 1 wherein the weight ratio of (I) to (II) employed is from 1:0.2 to 1:3.

5. A process as set forth in claim 1 wherein the weight ratio of (III) to (IV) employed is from 1:0.05 to 1:0.2.

6. A process as set forth in claim 1 wherein the weight ratio of (V) to (VI) employed is from 1:0.1 to 1:15.

7. A catalyst component containing titanium and/or vanadium for use in a Ziegler catalyst system, which component is a solid-phase product (VII) which has been produced by a process as defined in claim 1.

8. Ziegler catalyst system for olefin polymerization comprising
   (1) a catalyst component containing titanium and/or vanadium as set forth in claim 7, and
   (2) a metal compound of the general formula $MeA_{m-n}X_n$ as defined in claim 1, the atomic ratio of transition metal in catalyst component (1) to metal (Me) in component (2) being from 1:0.1 to 1:500.

* * * * *